Sept. 19, 1933.   P. REHLÄNDER   1,927,805
METHOD OF COLOR PHOTOGRAPHY
Filed Nov. 19, 1930
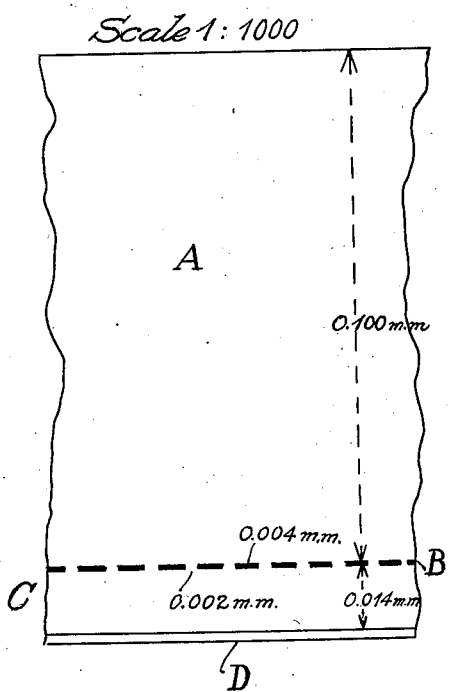
Inventor:
Paul Rehländer
by
Paul Fucklund
Attorney Patented Sept. 19, 1933

1,927,805

UNITED STATES PATENT OFFICE 1,927,805

METHOD OF COLOR PHOTOGRAPHY

Paul Rehländer, Berlin-Charlottenburg, Germany

Application November 19, 1930, Serial No. 496,803, and in Germany November 19, 1929

1 Claim. (Cl. 95—2)

This invention relates to the taking and reproducing photograms in natural colors and consists of an improvement in carrying out the method, which operates with a screen of alternating transparent and opaque lines or planes and a colored diaphragm placed in the taking and in the reproducing objective. (See Letters Patent No. 648,748.)

I place the black and white screen very near the photographic emulsion (in a distance of less than 0.1 mm.) and fasten it on that side of the emulsion support, which is free from the photographic emulsion. This screen of minute lines or planes alternating transparent and opaque is made by photographing a black and white screen of much greater dimensions with the known photographic methods.

The taking and the reproducing objective are provided with a color diaphragm, like the diaphragm described in Letters Patent No. 648,748 and used in the Berthon-process.

I describe the dimensions of a photographic film, which can be used for this proceeding and especially for cinematographic films.

I take a celluloid layer as is used for cinematographic work of 0.100 mm. thickness and provided on the one side with a photographic emulsion. On this emulsion I take in the usual way a photogram of a screen in black and white lines or plains, so that in the photogram the opaque lines are 0.015 mm. thick, the transparent lines 0.005 mm. Then I make on the other side of the film layer of 0.100 mm. thickness a panchromatic emulsion and take a photograph with an objective of 1:5 aperture and three colored stripes situated parallel to the screen-lines. After developing, inverting and fixing the photogram, I have a black and white image, that shows a natural colored image when projected by the same objective with the three colored stripes above mentioned.

When a more minute division of the screen is desirable for the image a screen is provided on the film support of 0.100 mm. in the same manner as described above with opaque lines of 0.004 mm. and transparent lines of 0.002 mm. This screen is provided with a celluloid or other waterproof varnish of nearly 0.014 mm. thickness and then on this new varnish a panchromatic emulsion is applied. Now with the objective with colored stripes (Berthon) a taking is made through the screen, the taking is developed inverted, fixed and dried. The projection, made in the inverted direction through the same objective shows a photogram in the natural colors.

In Fig. 1 a diagram is shown of the second example above mentioned in an enlarged measure (1=1000). A is the celluloid support, B the black and white screen, C the varnish layer, D the panchromatic emulsion.

It is understood, that the measures in these examples may be altered; but always these dimensions must be made so, that the relation of the distance of screen and photographic emulsion to the screen period must not be much greater than the aperture of the taking objective. It is better, to make it a little smaller. In the second example the period of the screen is: 0.002 mm. (transparent hole) +0.004 mm. (opaque plain) = 0.006 mm.

Screen period: screen distance=0.006:0.014. This relation is smaller than 1:2. The greater the aperture of the taking objective is, the smaller the distance of the screen from emulsion, and the smaller the screen period can be made.

Having thus described my invention, I claim as new and desire to have secured by Letters-Patent:

A photographic film for taking and reproducing photograms in natural colors which consists in a transparent support that is provided at one of both surfaces with a screen of alternating transparent and opaque areas, a transparent waterproof layer thinner than 0.1 m. m. on the said screen, the relation of the screen period to the thickness of the said layer being substantially equal to that of the effective diameter of the taking objective to its distance from the image, and a panchromatic emulsion on the said layer.

PAUL REHLÄNDER.